United States Patent [19]

(12) United States Patent
Yamaguchi

(10) Patent No.: US 8,791,959 B2
(45) Date of Patent: Jul. 29, 2014

(54) ELECTRONIC DEVICE WHICH RENDERS GRAPH, GRAPH DISPLAY METHOD AND RECORDING MEDIUM IN WHICH GRAPH RENDERING PROGRAM IS RECORDED

(75) Inventor: Hiromi Yamaguchi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 146 days.

(21) Appl. No.: 13/426,994

(22) Filed: Mar. 22, 2012

(65) Prior Publication Data
US 2012/0242690 A1    Sep. 27, 2012

(30) Foreign Application Priority Data

Mar. 25, 2011    (JP) ................................ 2011-066886

(51) Int. Cl.
*G06T 11/20*    (2006.01)
*G09G 5/00*    (2006.01)

(52) U.S. Cl.
USPC .......................................... 345/629; 345/440

(58) Field of Classification Search
USPC ........................................................ 345/629
See application file for complete search history.

(56) References Cited

U.S. PATENT DOCUMENTS

| | | | | |
|---|---|---|---|---|
| 5,245,559 | A | * | 9/1993 | Lapeyre ........................ 708/174 |
| 5,870,319 | A | * | 2/1999 | Thornton et al. ............. 708/160 |
| 6,081,819 | A | * | 6/2000 | Ogino ........................... 708/174 |
| 6,104,411 | A | * | 8/2000 | Ito et al. ........................ 345/440 |
| 6,470,293 | B1 | * | 10/2002 | Sudoh ........................... 702/156 |
| 6,992,685 | B2 | * | 1/2006 | Hallbauer et al. ............ 345/619 |
| 7,263,499 | B2 | * | 8/2007 | Kunigita .................... 705/26.64 |
| 7,777,744 | B2 | * | 8/2010 | Wostrel ......................... 345/440 |
| 2002/0044160 | A1 | | 4/2002 | Wattenberg et al. |
| 2004/0227738 | A1 | | 11/2004 | Sudoh |
| 2007/0195093 | A1 | * | 8/2007 | Springer et al. ........... 345/440.1 |
| 2007/0227738 | A1 | * | 10/2007 | Dennistoun et al. .......... 166/316 |

(Continued)

FOREIGN PATENT DOCUMENTS

| | | |
|---|---|---|
| EP | 1 229 498 A2 | 8/2002 |
| JP | 2003-131655 A | 5/2003 |

(Continued)

OTHER PUBLICATIONS

Related application: Hiroki Yoshizawa; U.S. Appl. No. 13/352,557, filed Jan. 18, 2012; Graphic Display Apparatus, Graphic Display Method and Recording Medium in Which Graphic Display Program is Recorded.
Extended European Search Report (EESR) dated May 29, 2012 (in English) in counterpart European Application No. 12152422.7.
fx-CG10 fx-CG20 Software User's Guide.
U.S. Office Action dated Dec. 20, 2013, issued in related U.S. Appl. No. 13/352,557.

*Primary Examiner* — M Good Johnson
(74) *Attorney, Agent, or Firm* — Holtz Holtz Goodman & Chick PC

(57) ABSTRACT

Disclosed is an electronic device including a display which displays an image, a graph graphic detection unit which detects a graph graphic matching any of predetermined graph shapes in the image, a graph rendering unit which renders a graph overlapping the graph graphic, a length input line segment designation unit which designates any one of line segments included in the image as a line segment subject to length input, a line segment length input unit which inputs a length of the line segment subject to length input, a point of origin setting unit which sets a point of origin of a coordinate system, a display range calculation unit which calculates a display range of the coordinate system, and a graph equation calculation unit which calculates a graph equation of the graph and displays a calculation result in the display.

11 Claims, 12 Drawing Sheets

(56) References Cited

U.S. PATENT DOCUMENTS

2008/0143746 A1* 6/2008 Irons .................. 345/629
2009/0040340 A1 2/2009 Nakase et al.
2009/0219290 A1* 9/2009 Kakie .................. 345/427
2009/0232363 A1 9/2009 Ohashi et al.

FOREIGN PATENT DOCUMENTS

| JP | 2004-252815 A | 9/2004 |
| JP | 2005-010850 A | 1/2005 |
| JP | 2006-010850 A | 1/2005 |
| JP | 2008-042580 A | 2/2008 |

* cited by examiner

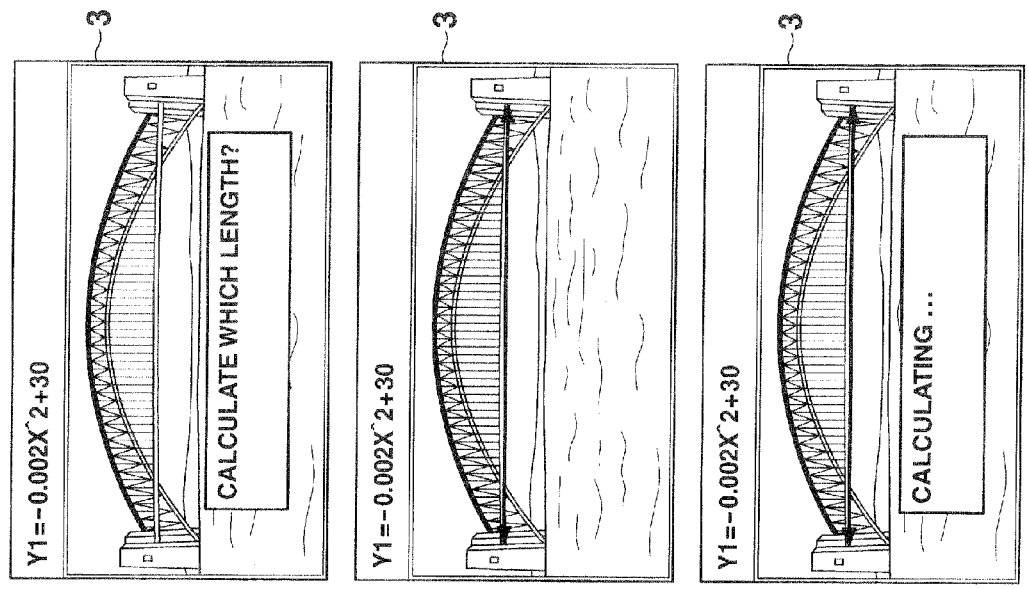
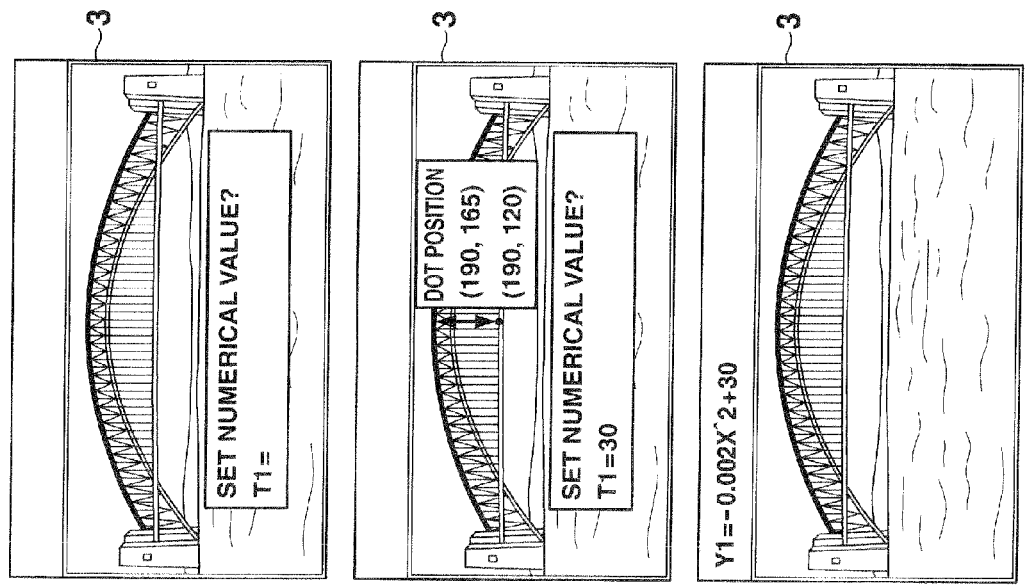

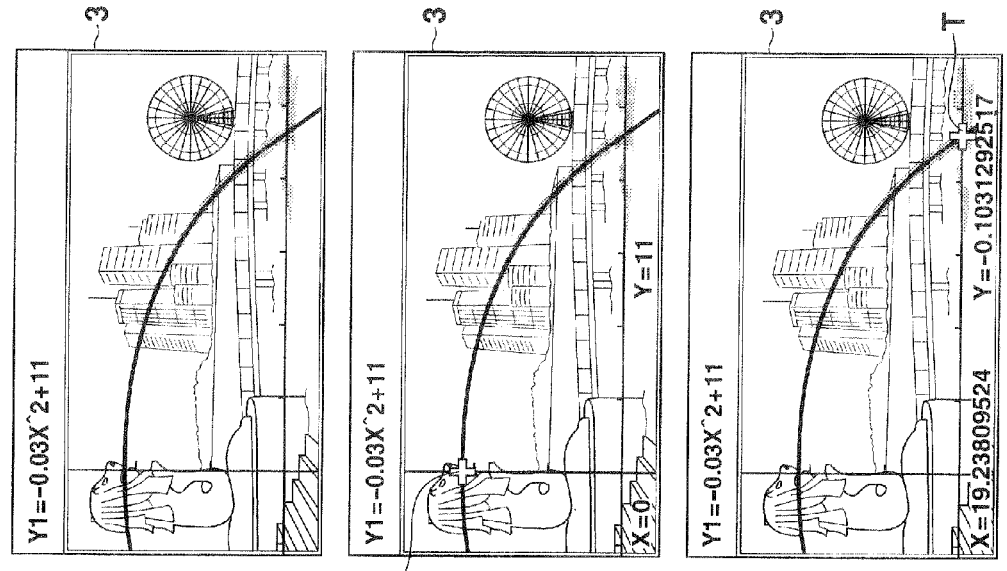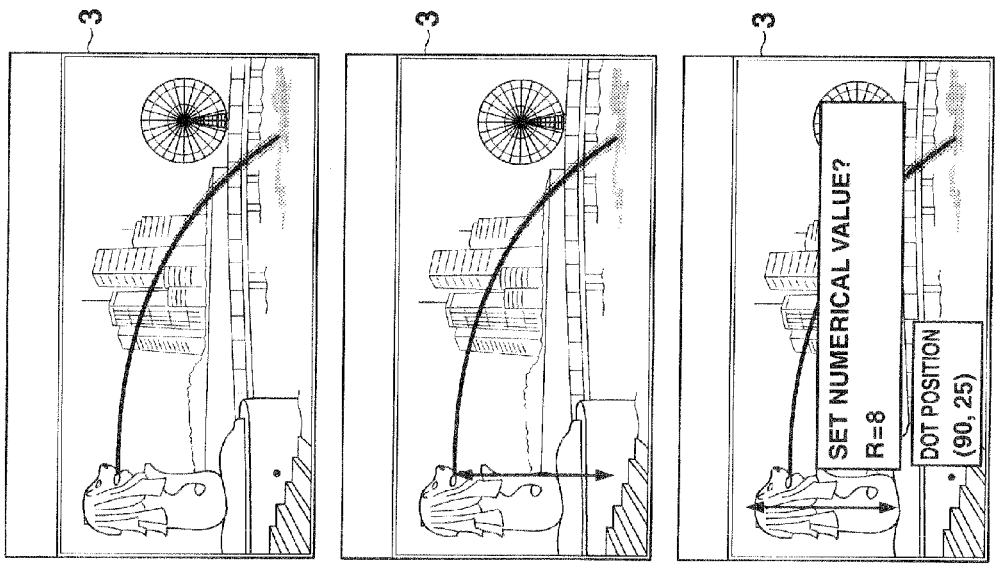

ELECTRONIC DEVICE WHICH RENDERS GRAPH, GRAPH DISPLAY METHOD AND RECORDING MEDIUM IN WHICH GRAPH RENDERING PROGRAM IS RECORDED

CROSS-REFERENCE TO RELATED APPLICATIONS

This application is based upon and claims the benefit of priority under 35 USC 119 of Japanese Patent Application No. 2011-066886 filed on Mar. 25, 2011, the entire disclosure of which, including the description, claims, drawings, and abstract, is incorporated herein by reference in its entirety.

BACKGROUND OF THE INVENTION

1. Field of the Invention

The present invention relates to an electronic device which renders a graph, a graph display method and a recording medium in which a graph rendering program is recorded.

2. Description of Related Art

Conventionally, in electronic devices in which a photographed image is to be displayed, a graph shape and a physical event can be studied in relation to each other by showing and rendering the measured data of a moving object as a graph while displaying the photographed image of the moving object as a background.

However, in the conventional art, merely a graph is rendered by connecting the plotted points based on the measured data, and the graph shape in the image and the graph equation expressed in line with the actual size of the graph shape cannot be studied in relation to each other.

SUMMARY OF THE INVENTION

It is, therefore, a main object of the present invention is to provide an electronic device in which a graph shape represented by an object or an event in an image and the graph equation expressing the graph shape in line with the actual size can be studied in relation to each other, a graph display method thereof and a recording medium.

In order to solve the above problem, according to the present invention, an electronic device includes a display which displays an image, a graph graphic detection unit which detects a graph graphic matching any of predetermined graph shapes in the image, a graph rendering unit which renders a graph overlapping the graph graphic which is detected by the graph graphic detection unit, a length input line segment designation unit which designates any one of line segments included in the image as a line segment subject to length input based on a user's operation, a line segment length input unit which inputs a length of the line segment subject to length input based on a user's operation, a point of origin setting unit which sets a point of origin of a coordinate system in the image according to a position and a shape of the graph, a display range calculation unit which calculates a display range of the coordinate system which is to be set so as to superimpose on the image based on the length of the line segment subject to length input, and a graph equation calculation unit which calculates a graph equation of the graph and displays a calculation result in the display based on the display range.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 8A is a diagram showing a display content of the display;

FIG. 8B is a diagram showing a display content of the display;

FIG. 8C is a diagram showing a display content of the display;

FIG. 8D is a diagram showing a display content of the display;

FIG. 8E is a diagram showing a display content of the display;

FIG. 8F is a diagram showing a display content of the display;

FIG. 12A is a diagram showing a display content of the display;

FIG. 12B is a diagram showing a display content of the display;

FIG. 12C is a diagram showing a display content of the display;

FIG. 12D is a diagram showing a display content of the display;

FIG. 12E is a diagram showing a display content of the display; and

FIG. 12F is a diagram showing a display content of the display.

DESCRIPTION OF THE PREFERRED EMBODIMENT

Hereinafter, an example of the embodiment of the present invention will be described in detail with reference to the appended drawings. Here, the scope of the invention is not limited to the exemplifications.

1. CONFIGURATION OF SCIENTIFIC ELECTRONIC CALCULATOR

[1-1. Outer Configuration]

Figure 1:
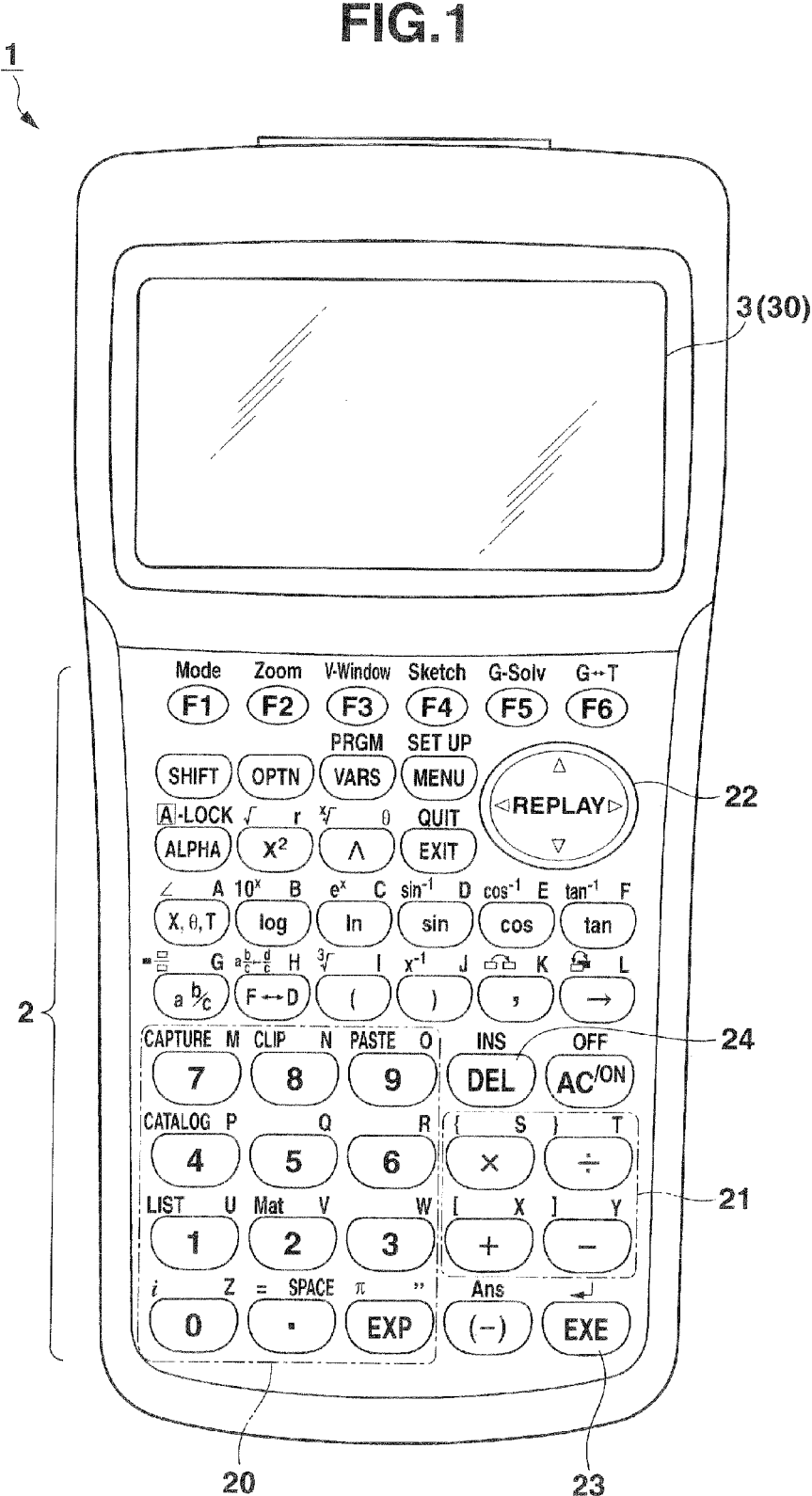
FIG. 1 is a plane view showing an outline configuration of a scientific electronic calculator.

FIG. 1 is a conceptual diagram showing an outline configuration of a scientific electronic calculator 1.

As shown in FIG. 1, the scientific electronic calculator 1 includes input key group 2 which includes groups of various types of keys and a display 3.

The input key group 2 is a group of keys for receiving input operations of equation components such as numeric values and arithmetic symbols made by a user and receiving instructional operations of various types of processing. The input key group 2 includes a plurality of keys, each of which is assigned with a specific function. In the embodiment, the input key group 2 includes numeric keys 20, arithmetic symbol keys 21, a cursor key 22, an EXE key 23, a delete key 24 and so forth.

Among the keys, the numeric keys 20 are keys for receiving input operations of numerical values, the arithmetic symbol keys 21 are keys for receiving input operations of various types of arithmetic symbols such as symbols of four arithmetic operations, parenthesis, the vinculum of a fraction, radical (√), logarithmic symbols, constant numbers (the circular constant "π", speed of light "c" and so forth), trigonometric function symbols and the like.

The cursor key 22 is a key which is pushed when moving the cursor indicating the position of editing subject or the position of selection subject in a predetermined direction within the display 3, and the cursor key 22 is configured to input the four directions which are up, down, right and left in the embodiment.

The EXE key 23 is a key to receive input operations such as execution instructions and decision instructions of processing, and for example, the EXE key 23 functions as a key to instruct execution of arithmetic processing after a mathematical function is input. The delete key 24 is a key for receiving operations to delete numeric values, arithmetic symbols and so forth which are displayed in the display 3.

The display 3 is constituted of a LCD (Liquid Crystal Display), an ELD (Electronic Luminescent Display) or the like, and displays characters, symbols, mathematical functions, arithmetic results, coordinate axes, graphs and so forth according to operations of the input key group 2 and the like and also displays various types of data which are required for using the scientific electronic calculator 1 in a plurality of dots. Here, in the display 3 of this embodiment, X axis is displayed in horizontal direction and Y axis is displayed in vertical direction to show XY coordinates by the X and Y axes, and the numbers of dots in Y axis direction and X axis direction are "186" and "378", respectively. In this embodiment, each dot is a square shape and horizontal length and vertical length thereof are the same. Further, on the display 3 of this embodiment, the touch panel 30 is integrally provided across the entire display screen.

[1-2. Functional Configuration]

Next, functional configuration of the scientific electronic calculator 1 will be described.

Figure 2:
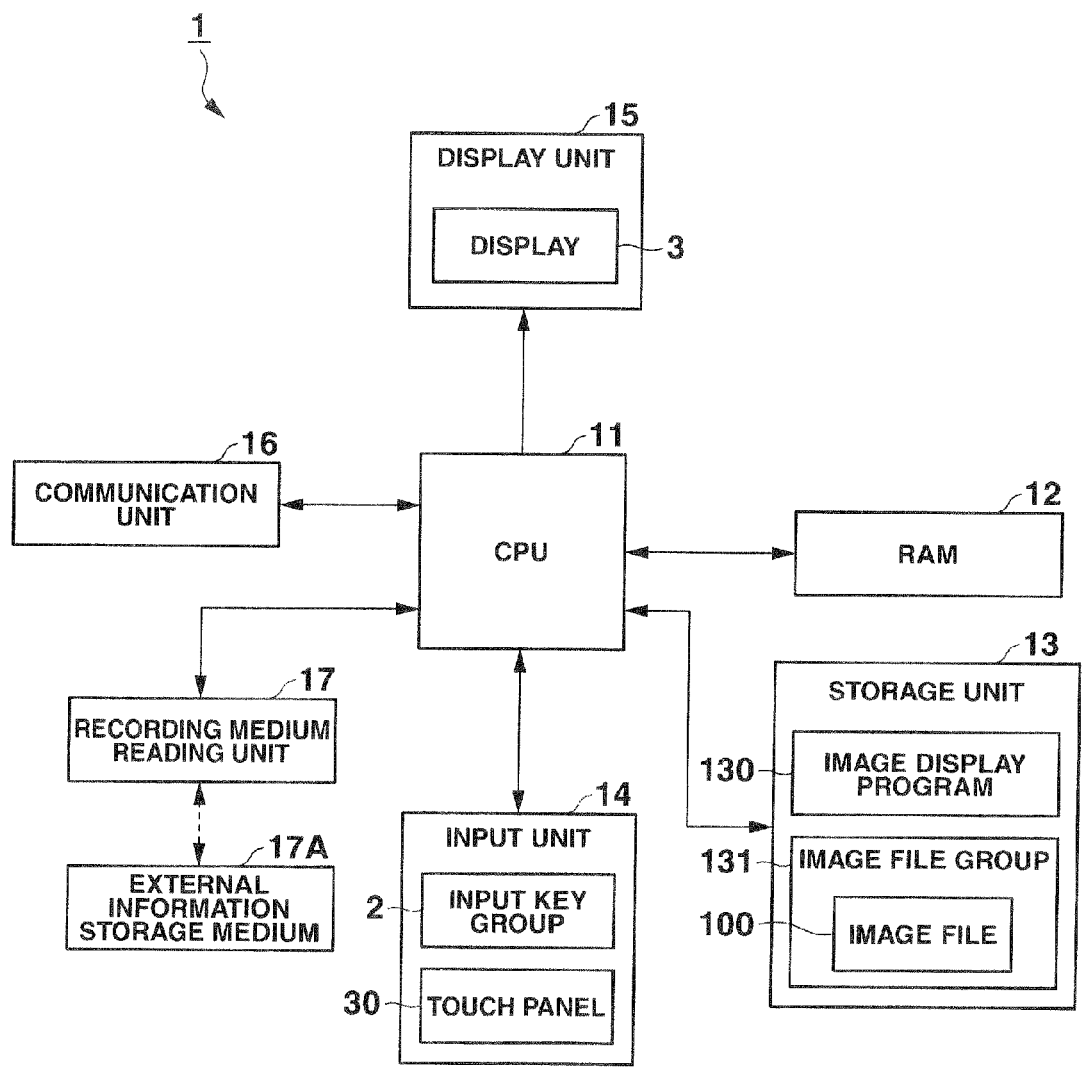
FIG. 2 is a block view showing a functional configuration of the scientific electronic calculator.

FIG. 2 is a block diagram showing an outline of functional configuration of the scientific electronic calculator 1.

As shown in FIG. 2, the scientific electronic calculator 1 includes an input unit 14, a display unit 15, a communication unit 16, a recording medium reading unit 17, a RAM (Random Access Memory) 12, a storage unit 13 and a CPU (Central Processing Unit) 11.

The input unit 14 includes the above-mentioned input key group 2 and the touch panel 30, and outputs signals corresponding to the pushed keys and the pushed positions in the touch panel 30.

The display unit 15 includes the above-mentioned display 3, and displays various types of information according to the display signals from the CPU 11 in the display 3.

The communication unit 16 is connectable to internet, and hereby the communication unit 16 can communicate with an external device which is connected to internet.

The recording medium reading unit 17 is for reading information from an external information storage medium 17A, such as a USB memory, which is detachably inserted.

The RAM 12 is a volatile memory in which information is temporarily stored and includes a plurality of work areas for storing various types of programs to be executed, data according to the various types of programs and the like.

The storage unit 13 is a non-volatile memory constituted of a ROM (Read Only Memory) or the like, and stores various types of programs and data. In particular, the screen display program 130 as a program according to the present invention and the image file group 131 are stored in the storage unit 13.

Figure 3:
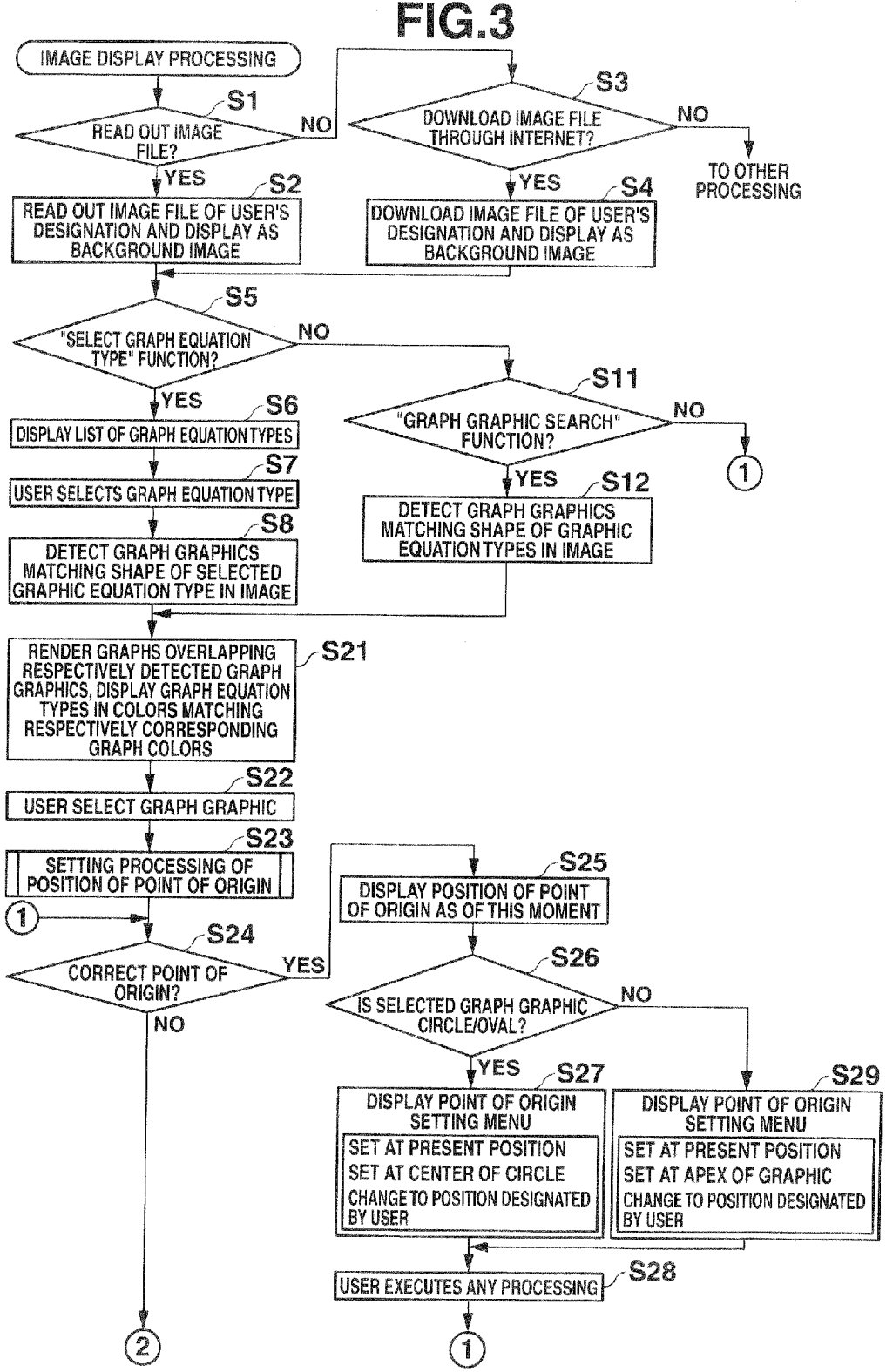
FIG. 3 is a flowchart showing a flow of an image display processing.
Figure 4:
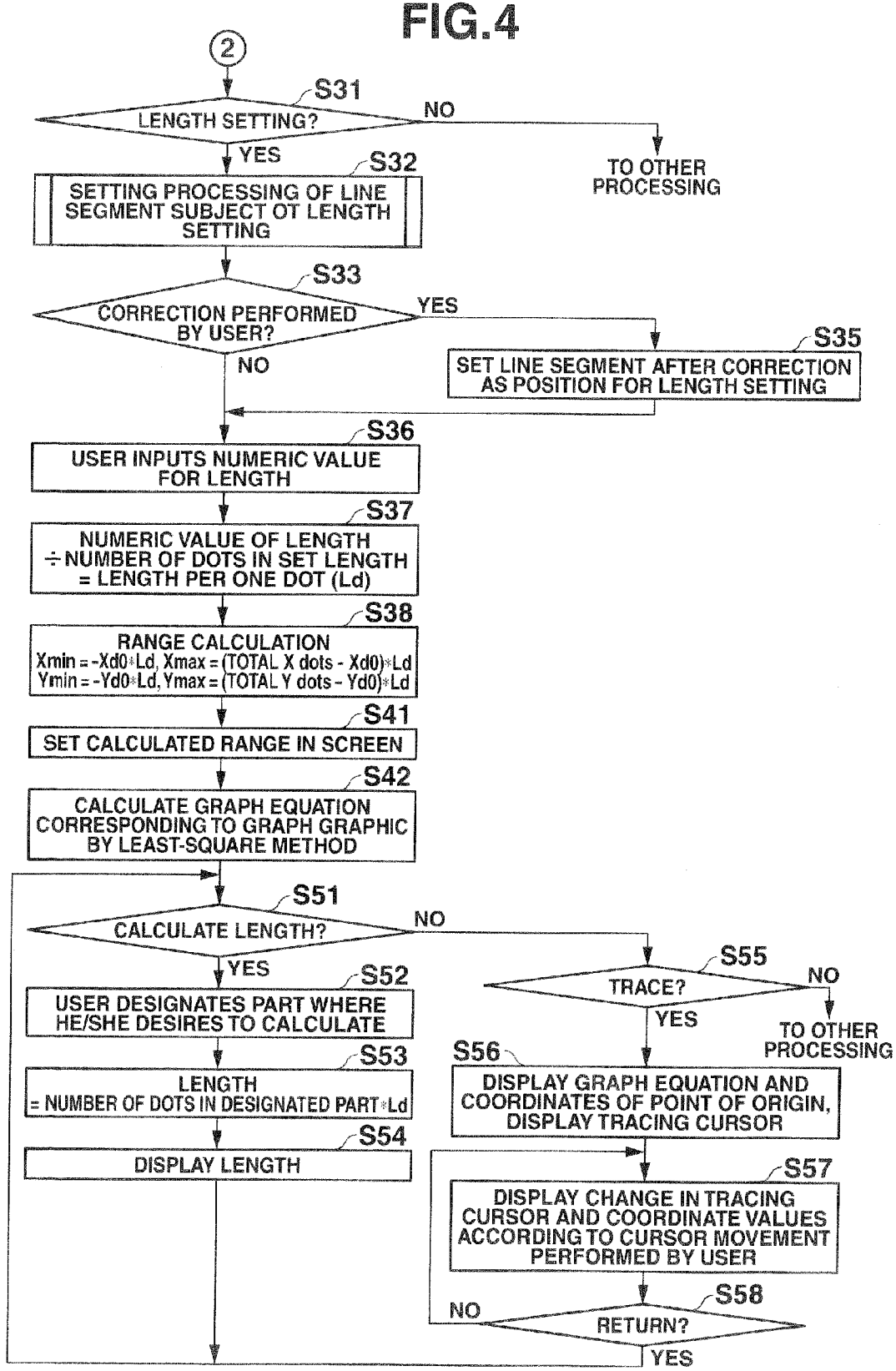
FIG. 4 is a flowchart showing the flow of the image display processing.

The screen display program 130 is a program to make the CPU 11 execute the after-mentioned screen display processing (see FIGS. 3 to 4).

The image file group 131 stores a plurality of image files 100 regarding images which can be displayed in the display 3. These image files 100 are to be received through the communication unit 16.

The CPU 11 integrally controls each part of the scientific electronic calculator 1. In particular, the CPU 11 expands the system program and a specified program among various types of application programs stored in the storage unit 13 in the RAM 12 and executes various types of processing by cooperating with the programs expanded in the RAM 12.

2. OPERATION OF SCIENTIFIC ELECTRONIC CALCULATOR

Next, operation of the scientific electronic calculator will be described with reference to FIGS. 3 and 4.

FIGS. 3 and 4 show a flowchart for explaining the operation of image display processing which is executed by the CPU 11 reading out the image display program 130 from the storage unit 13.

As shown in FIG. 3, in the image display processing, the CPU 11 first determines whether an operation for reading out an image file 100 from the storage unit 13 is to be performed (step S1). When the CPU 11 determines that the operation for reading out an image file 100 from the storage unit 13 is performed (step S1; Yes), the CPU 11 reads out the image file 100 designated by user's operation from the storage unit 13 and displays the image file 100 in the display 3 as the background image, and then, proceeds to the after-mentioned step S5.

When the CPU 11 determines that the operation for reading out an image file 100 from the storage unit 13 is not performed in step S1 (step S1; No), the CPU 11 determines whether an operation for downloading an image file 100 through internet is to be performed (step S3). When the CPU 11 determines that the operation for downloading an image file 100 through internet is not performed (step S3; No), the CPU 11 proceeds to other processing.

When the CPU 11 determines that the operation for downloading an image file 100 is performed in step S3 (step S3; Yes), the CPU 11 downloads the image file 100 designated by user's operation and stores the image file 100 in the storage unit 13, and also, the CPU 11 displays the image file 100 in the display 3 as the background image (step S4).

Next, the CPU 11 determines whether an operation for selecting a graph equation type is to be performed (step S5). When the CPU 11 determines that the operation for selecting a graph equation type is performed (step S5; Yes), the CPU 11 displays a list of graph equation types (in this embodiment, general equations of graphs and graph shapes) in the display 3 (step S6) and selects any of the graph equation types based on user's operation (step S7).

Then, the CPU 11 detects graph graphics matching the graph shape of the selected graph equation type in the background image displayed in the display 3 (step S8), and thereafter, proceeds to the after-mentioned step S21.

When the CPU 11 determines that the operation for selecting a graph equation type is not to be performed in the above step S5 (step S5; No), the CPU 11 determines whether an operation for searching graph graphics is to be performed (step S11). When the CPU 11 determines that the operation for searching graph graphics is not to be performed (step S11; No), the CPU 11 proceeds to the after-mentioned step S24.

When the CPU 11 determines that the operation for searching graph graphics is performed in step S11 (step S11; Yes), the CPU 11 detects graph graphics of circle, oval and parabola in the background image displayed in the display 3 (step S12).

Next, the CPU 11 renders graphs each of which overlapping each graph graphic detected in the background image and displays each graph equation in same color as the display color of the corresponding graph (step S21).

Then, the CPU 11 selects any of the graph graphics as the selected graph graphic based on user's operation and deletes the graphs and graph equations of the non selected graph graphics from the display 3 (step S22), and thereafter, the CPU 11 carries out setting processing of the position of the point of origin (step S23).

Figure 5:
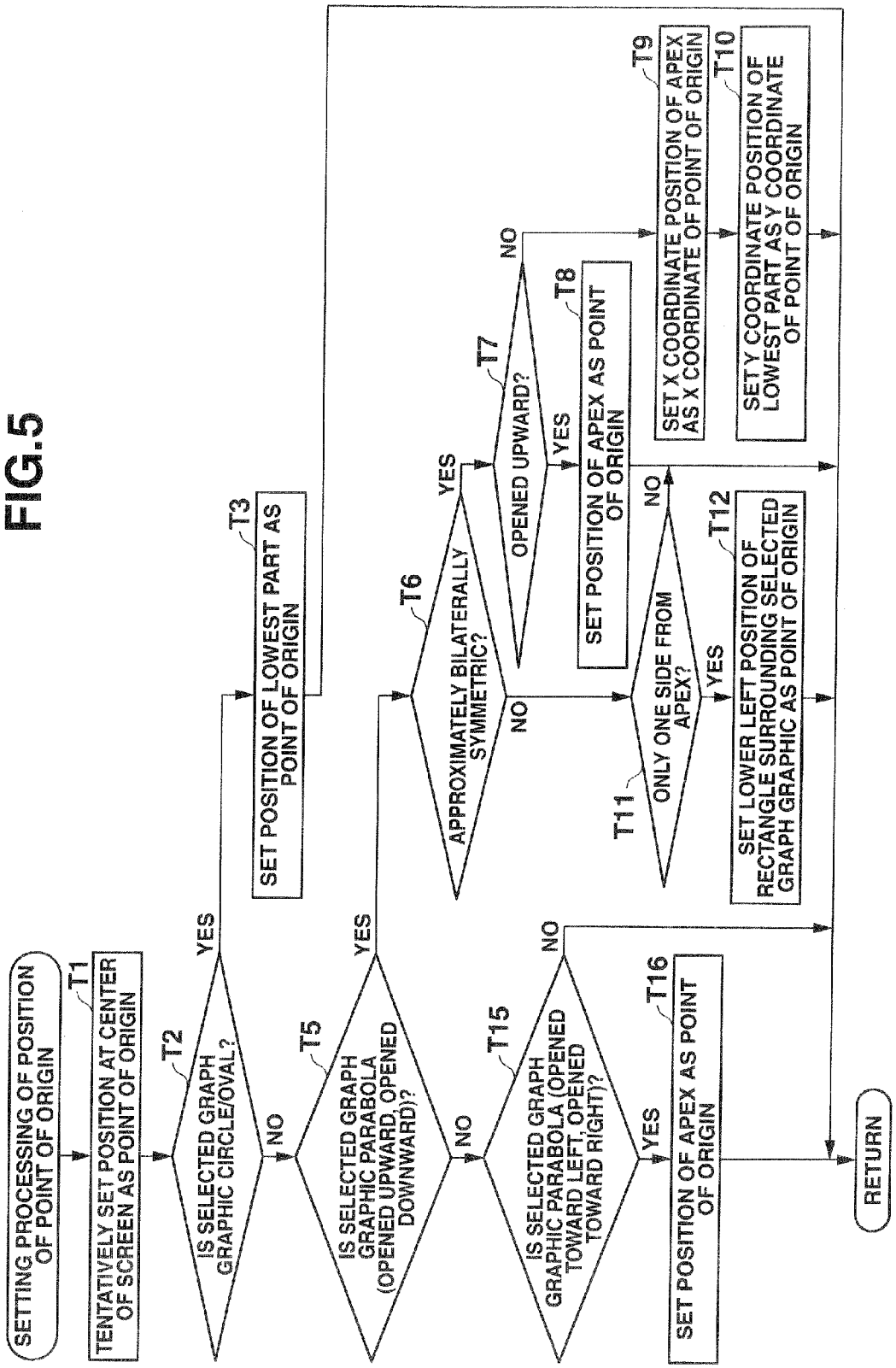
FIG. 5 is a flowchart showing a flow of a setting processing of the position of the point of origin.
Figure 6:
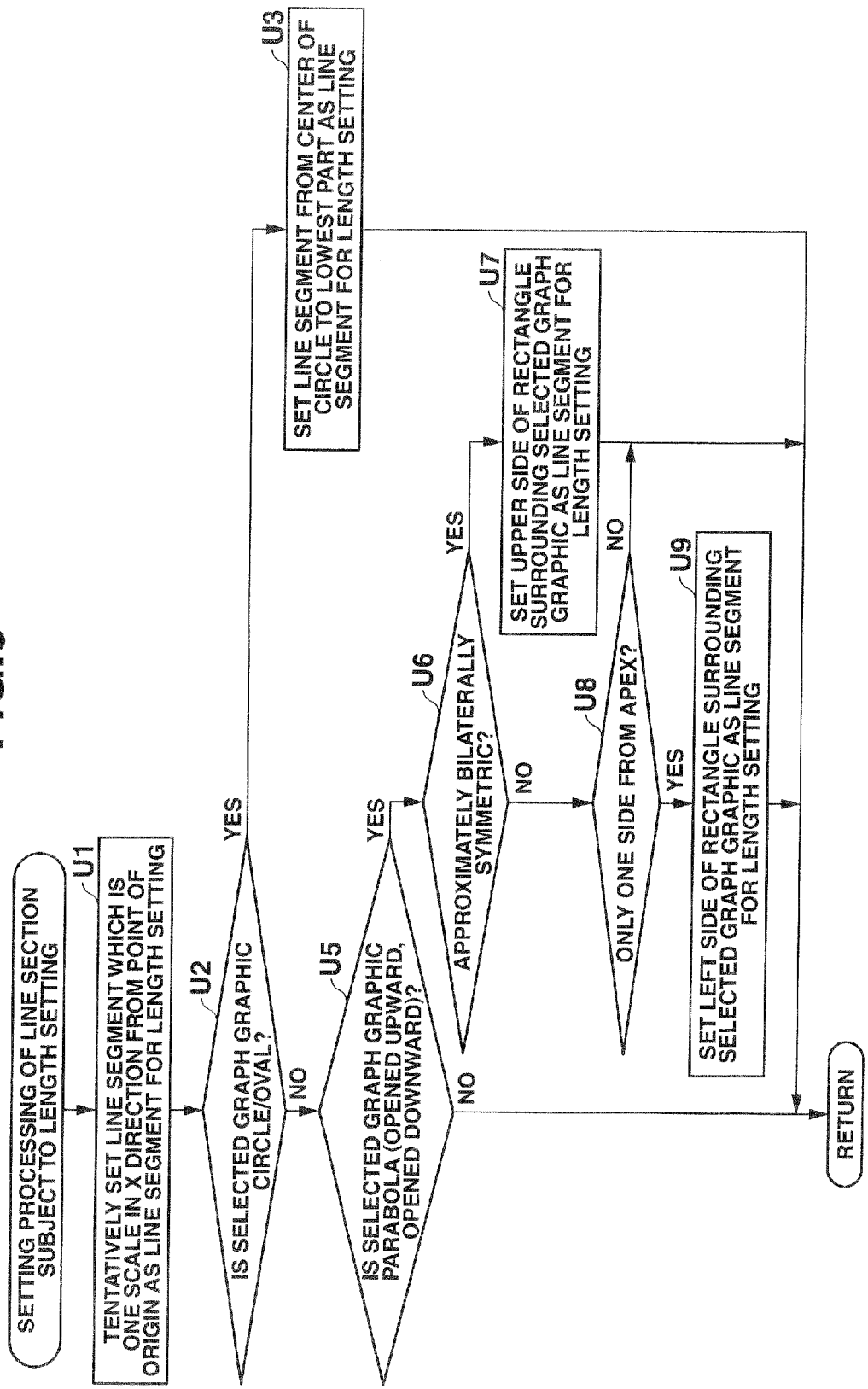
FIG. 6 is a flowchart showing a flow of a setting processing of a line segment subject to length setting.

In particular, as shown in FIG. 5, the CPU 11 first tentatively sets the center of the display region in the display 3 as the point of origin in the setting processing of the position of the point of origin (step T1), and thereafter, the CPU 11 determines whether the selected graph graphic is a circle or an oval (step T2).

When the CPU 11 determines that the selected graph graphic is a circle or an oval in step T2 (step T2; Yes), the CPU 11 resets the position of the point of origin so that the lowest part of the graph graphic be the position of the point of origin (step T3) and ends the setting processing.

When the CPU 11 determines that the selected graph graphic is not a circle or an oval in step T2 (step T2; No), the CPU 11 determines whether the selected graph graphic is parabola opened upward or downward among various parabolas (step T5).

When the CPU 11 determines that the selected graph graphic is a parabola opened upward of downward among various parabolas in step T5 (step T5; Yes), the CPU 11 determines whether the selected graph graphic is approximately bilaterally symmetric, that is, whether the selected graph graphic is one-sided in either left or right with respect to the apex of the graphic (step T6).

When the CPU 11 determines that the selected graph graphic is approximately bilaterally symmetric in step T6 (step T6; Yes), the CPU 11 determines whether the selected graph graphic is opened upward (step T7).

When the CPU 11 determines that the selected graph graphic is opened upward in step T7 (step T7; Yes), the CPU 11 resets the position of the point of origin so that the apex (the lowest part) of the selected graph graphic be the position of the point of origin (step T8) and then ends the setting processing.

When the CPU 11 determines that the selected graph graphic is not opened upward in step T7, that is, when the CPU 11 determines that the selected graph graphic is opened downward (step T7; No), the CPU 11 resets the position of the point of origin so that the X coordinate of the apex (the uppermost part) be the X coordinate of the point of origin (step T9) and so that the Y coordinate of the lowest part of the selected graph graphic be the Y coordinate of the point of origin (step T10), and ends the setting processing.

When the CPU 11 determines that the selected graph graphic is not approximately bilaterally symmetric in step T6 (step T6; No), the CPU 11 determines whether the selected graph graphic is only one side of the parabola from its the apex (step T11). When the CPU 11 determines that the selected graph graphic is not only one side of the parabola (step T11; No), the CPU 11 sets the position of the point of origin as it is tentatively set in step T1 and ends the setting processing.

When the CPU 11 determines that the selected graph graphic is only one side of the parabola from its apex in step T11 (step T11; Yes), the CPU 11 resets the position of point of origin so that the lower left corner of a rectangle which surrounds the selected graph graphic be the position of the point of origin (step T12) and ends the setting processing.

When the CPU 11 determines that the selected graph graphic is not a parabola opened upward or downward among various parabolas in step T5 (step T5; No), the CPU 11 determines whether the selected graph graphic is a parabola opened toward left or right among various parabolas (step T15). When the CPU 11 determines that the selected graph graphic is not a parabola opened toward left or right (step T15; No), the CPU 11 sets the position of the point of origin as it is tentatively set in step T1 and ends the setting processing.

When the CPU 11 determines that the selected graph graphic is a parabola opened toward left or right in step T15 (step T15; Yes), the CPU 11 resets the position of the point of origin so that the apex of the selected graph graphic be the position of the point of origin (step T16) and ends the setting processing.

According to the above steps T2 to T16, the point of origin of the coordinate system is to be set in the image (in the display region) according to the position and shape of the selected graph graphic (the graph rendered in the display 3).

Next, after the setting processing of the position of the point of origin is ended, the CPU 11 determines whether an operation for correcting the position of the point of origin is to be performed (step S24) as shown in FIG. 3. When the CPU 11 determines that the operation for correcting the position of the point of origin is performed (step S24; Yes), the CPU 11 displays the point of origin at the position of the point of origin which is set as of this moment (step S25).

Next, the CPU 11 determines whether the selected graph graphic is a circle or an oval (step S26). When the CPU 11 determines that the selected graph graphic is a circle or an oval (step S26; Yes), the CPU 11 displays setting menu of the position of the point of origin (step S27). Here, three menus which are "set at present position", "set at center of circle" and "change to position designated by user" are used as the setting menu to be displayed in step S27. When the menu "set at present position" is selected, the position of the point of origin which is set as of this moment is maintained without being changed. When the menu "set at center of circle" is selected, the center of the selected graph graphic (circle or oval) is set as the position of the point of origin. Further, when the menu "change to position designated by user" is selected, the designated position based on user's operation is set as the position of the point of origin.

Next, the CPU 11 resets the position of the point of origin according to the menu selected by a user (step S28) and proceeds to the above-mentioned step S24.

When the CPU 11 determines that the selected graph graphic is not a circle or an oval in step S26 (step S26; No), the CPU 11 displays setting menu of the position of the point of origin (step S29) and proceeds to the above-mentioned step S28. Here, three menus which are "set at present position", "set at apex of graphic" and "change to position designated by user" are used as the setting menu to be displayed in step S29. When the menu "set at apex of graphic" is selected, the apex of the selected graph graphic (parabola) is set as the position of the point of origin.

When the CPU 11 determines that the operation for correcting the position of the point of origin is not to be performed in the above-mentioned step S24 (step S24; No), the CPU 11 determines whether an operation for setting the length of a line segment in the background image is to be performed (step S31) as shown in FIG. 4. When the CPU 11 determines that the operation for setting the length of a line segment is not performed (step S31; No), the CPU 11 proceeds to other processing.

When the CPU 11 determines that the operation for setting the length of a line segment in the background image is performed in step S31 (step S31; Yes), the CPU 11 carried out setting processing to the line segment which is subject to length setting (step S32).

In particular, in the setting processing of the line segment which is subject to length setting, the CPU 11 first tentatively sets the line segment which is one scale from the point of origin in the positive direction on X axis as the line segment subject to length setting (step U1). Here, the intervals of the scales on X axis are set by default.

Next, the CPU 11 determines whether the selected graph graphic is a circle or an oval (step U2). When the CPU 11 determines that the selected graph graphic is a circle or an oval (step U2; Yes), the CPU 11 resets the line segment so that the line segment from the center of the circle to the lowest part of the circle be the line segment subject to length setting (step U3) and ends the setting processing.

When the CPU 11 determines that the selected graph graphic is not a circle or an oval in step U2 (step U2; No), the CPU 11 determines whether the selected graph graphic is a parabola opened upward or downward among various parabolas (step U5).

When the CPU 11 determines that the selected graph graphic is not a parabola opened upward or downward among various parabolas in step U5 (step U5; No), the CPU 11 sets the line segment subject to length setting as it is tentatively set in step U1 and ends the setting processing.

When the CPU 11 determines that the selected graph graphic is a parabola opened upward or downward among various parabolas in step U5 (step U5; Yes), the CPU 11 determines whether the selected graph graphic is approximately bilaterally symmetric (step U6).

When the CPU 11 determines that the selected graph graphic is approximately bilaterally symmetric in step U6 (step U6; Yes), the CPU 11 resets the line segment subject to length setting so that the upper side of the rectangle which surrounds the selected graph graphic be the line segment subject to length setting (step U7) and ends the setting processing.

When the CPU 11 determines that the selected graph graphic is not approximately bilaterally symmetric in step U6 (step U6; No), the CPU 11 determines whether the selected graph graphic is only one side of the parabola from its apex (step U8). When the CPU 11 determines that the selected graph graphic is not only one side of the parabola (step U8; No), the CPU 11 sets the line segment subject to length setting as it is tentatively set in step U1 and ends the setting processing.

When the CPU 11 determines that the selected graph graphic is only one side of the parabola from its apex in step U8 (step U8; Yes), the CPU 11 resets the line segment subject to length setting so that the left side of the rectangle which surrounds the selected graph graphic be the line segment subject to length setting (step U9) and ends the setting processing.

When the above described setting processing of the line segment subject to length setting is ended, the CPU 11 next determines whether an operation for correcting the line segment subject to the setting is to be performed (step S33) as shown in FIG. 4. When the CPU 11 determines that the operation for correcting is not to be performed (step S33; No), the CPU 11 proceeds to the after-mentioned step S36.

When the CPU 11 determines that the operation for corrected the line segment subject to the setting is performed in step S33 (step S33; Yes), the CPU 11 resets the line segment subject to the setting so that an arbitrary line segment in the background image be the line segment subject to the setting based on user's operation (step S35).

Then, when the length of the line segment subject to length setting is input by a user (step S36), the CPU 11 calculates the length per one dot (Ld) by dividing the input numeral value by the number of dots in the line segment (step S37).

Next, the CPU 11 calculates the display range of XY coordinate system by the following equations (step S38). In the equations, Xd0 is the dot position of the point of origin in X axis direction (the number of dots from the left end of the display region), and Yd0 is the dot position of the point of origin in Y axis direction (the number of dots from the lower end of the display region).

$$X\mathrm{min} = -Xd0 \times Ld$$

$$X\mathrm{max} = (\text{total number of dots in } X \text{ direction} - Xd0) \times Ld$$

$$Y\mathrm{min} = Yd0 \times Ld$$

$$Y\mathrm{max} = (\text{total number of dots in } Y \text{ direction} - Yd0) \times Ld$$

After the CPU 11 sets the calculated display range as the display region of the display 3 (step S41), the CPU 11 calculates the graph equation of the selected graph graphic by the least-square method based on the display range and displays the calculation result in the display 3 (step S42).

Next, the CPU 11 determines whether an operation for calculating the length of a line segment in the background image is to be performed (step S51).

When the CPU 11 determines that the operation for calculating the length of a line segment in the background image is performed (step S51; Yes), the CPU 11 designates an arbitrary line segment in the background image as the line segment subject to length calculation based on user's operation (step S52), calculates the length of the designated line segment by multiplying the number of dots in the designated line segment by the length per one dot (Ld=the number of dots in the line segment subject of length setting/length of the line segment) (step S53) and displays the calculated length in the display 3 (step S54), and thereafter, the CPU 11 proceeds to the above-mentioned step S51.

When the CPU 11 determines that the operation for calculating the length of a line segment is not to be performed in step S51 (step S51; No), the CPU 11 determines whether an operation to execute tracing of the selected graph graphic is to be performed (step S55). When the CPU 11 determines that the operation to execute tracing of the selected graph graphic is not to be performed (step S55; No), the CPU 11 proceeds to other processing.

When the CPU 11 determines that the operation to execute tracing of the selected graph graphic is performed in step S55 (step S55; Yes), the CPU 11 displays the graph equation of the selected graph graphic and also displays a tracing cursor T (see FIG. 9B, for example) at a predetermined point (for example, the point of origin) on the selected graph graphic, and further, the CPU 11 displays the coordinates of the tracing cursor T (step S56).

Next, the CPU 11 moves the tracing cursor T on the selected graph graphic according to user's cursor operation and displays the coordinates of the tracing cursor T after the moving (step S57).

Then, the CPU 11 determines whether an operation for returning to the processing before the execution of tracing is to be performed (step S58). When the CPU 11 determines that the operation for returning to the processing before the execution of tracing is not to be performed (step S58; No), the CPU 11 proceeds to the above-mentioned step S57. On the other hand, when the CPU 11 determines that the operation for returning to the processing before the execution of tracing is performed (step S58; Yes), the CPU 11 proceeds to the above-mentioned step S51.

3. OPERATION EXAMPLE

Next, the above operation will be described in detail with reference to the drawings.

Operation Example (1)

Figure 7A:
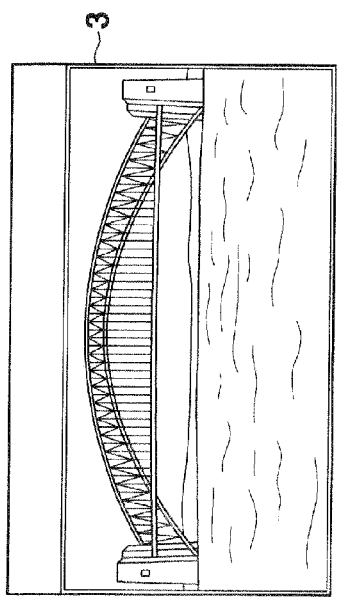
FIG. 7A is a diagram showing a display content of a display.

First, a user performs an operation for reading out an image file 100 from the storage unit 13 (step S1; Yes). When an image file 100 is designated, the designated image file 100 is read out from the storage unit 13 and displayed in the display 3 as the background image (step S2) as shown in FIG. 7A. Here, in this operation example, a photographed image of an arch bridge bridged over a river is displayed as the background image.

Figure 7B:
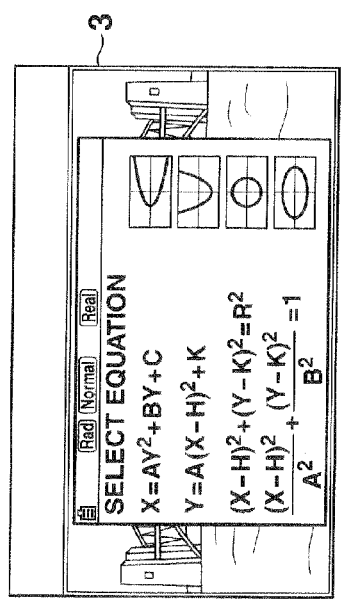
FIG. 7B is a diagram showing a display content of the display.

Next, when a user performs an operation for selecting a graph equation type (step S5; Yes), a list of graph equation types (general equations of graphs and graph shapes) is displayed in the display 3 (step S6) as shown in FIG. 7B.

Figure 7C:
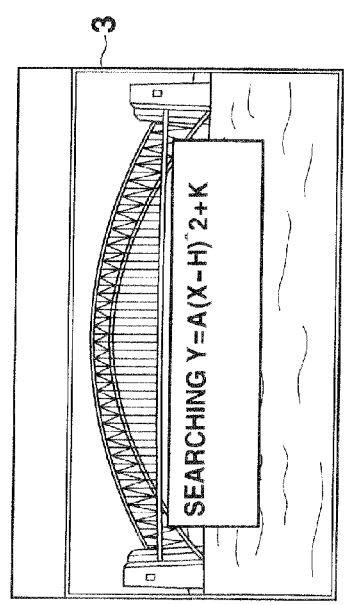
FIG. 7C is a diagram showing a display content of the display.
Figure 7D:
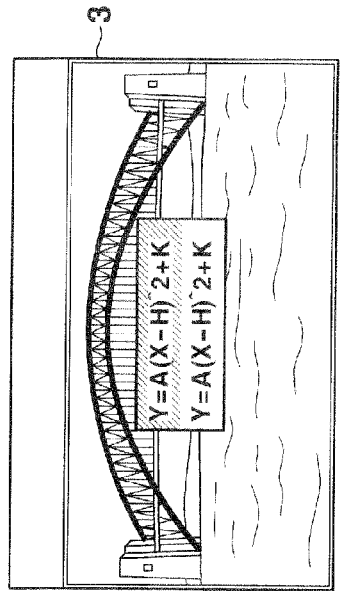
FIG. 7D is a diagram showing a display content of the display.

Thereafter, when a user selects the graph equation type "$Y=A(X-H)^2+K$" (a parabola opened upward or downward) (step S7), graph graphics matching the graph shape of the selected graph equation type (here, two arch portions in the arch bridge) are detected in the background image (step S8) as shown in FIGS. 7C and 7D, graphs are rendered respectively overlapping the detected graph graphics and the graph equations are displayed respectively in the same color as the display color of the corresponding graphs (step S21). Here, in FIG. 7D, the graph overlapping the upper arch portion and the upper graph equation "$Y=A(X-H)^2+K$" are displayed in blue, and the graph overlapping the lower arch portion and the lower graph equation "$Y=A(X-H)^2+K$" are displayed in red.

Figure 7E:
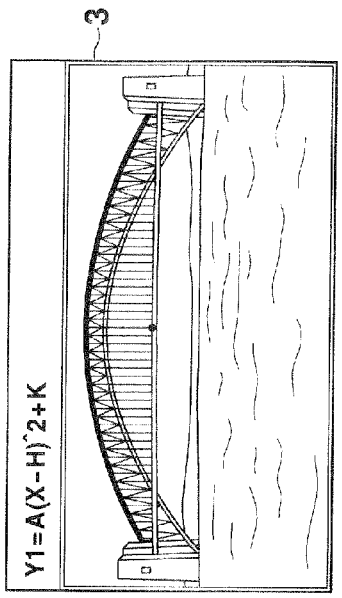
FIG. 7E is a diagram showing a display content of the display.
Figure 7F:
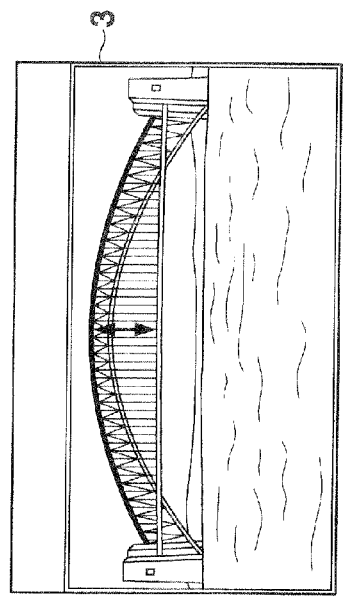
FIG. 7F is a diagram showing a display content of the display.

Next, when a user selects the graph graphic of the upper arch shape as the selected graph graphic, the graph and graph equation of the lower graph graphic are deleted from the display 3 as shown in FIG. 7E (step S22).

Then, the selected graph graphic is determined as being a parabola opened upward or downward among various parabolas (step T5; Yes), being approximately bilaterally symmetric (step T6; Yes) and not opened upward (step T7; No). Further, the X coordinate position of the apex (the uppermost part) is sets as the X coordinate position of the point of origin (step T9) and the Y coordinate position of the lowest part of the selected graph graphic is set as the Y coordinate position of the point of origin (step T10). In FIG. 7E, a black dot is shown at the point of origin set as described above for the sake of convenience (see approximately center of the diagram).

Next, a user performs an operation for setting the length of a line segment in the background image (step S31; Yes) and performs an operation for correcting the line segment subject to the setting (step S33; Yes). Thereafter, the line segment subject to length setting is reset so that the line segment which is from the point of origin to the apex of the graph graphic in the background image, that is a line segment corresponding to the height of the arch portion, be the line segment subject to length setting (step S35).

Next, when a user inputs the length "30" of the line segment subject to length setting based on the actual height of the arch bridge in the image (step S36) as shown in FIGS. 8A and 8B, the length per one dot (Ld=0.667 . . . ) is calculated by dividing the input numeral value "30" by the number of dots in the line segment (here, "45") (step S37) and the display range of XY coordinate system (Xmin=−126, Xmax=126, Ymin=−80, Ymax=44) is calculated (step S38).

Then, after the calculated display range is set in the display range of the display 3 (step S41), the graph equation of the selected graph graphic is calculated by the least-square method based on the display range, and the calculation result "$Y=-0.002X^2+30$" is displayed in the display 3 as shown in FIG. 8C (step S42).

Figure 9A:
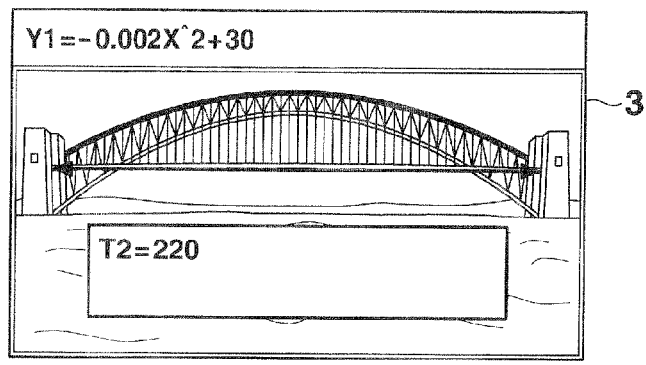
FIG. 9A is a diagram showing a display content of the display.

Next, when a user performs an operation for calculating the length of a line segment in the background image (step S51; Yes) and designates the line segment corresponding to the bridge length as the line segment subject to length calculation (step S52) as shown in FIGS. 8D and 8E, the length "220" of the designated line segment is calculated and displayed by multiplying the number of dots in the designated line segment by the length per one dot (Ld=0.667 . . . ) (steps S53 and S54) as shown in FIGS. 8F and 9A.

Figure 9B:
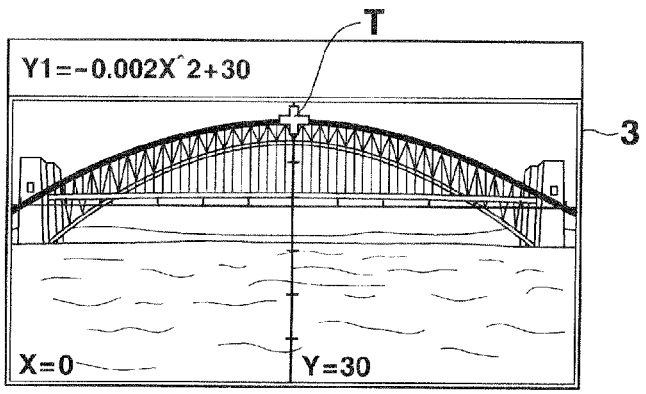
FIG. 9B is a diagram showing a display content of the display.

Thereafter, when a user performs an operation to execute tracing of the selected graph graphic (step S55; Yes), a tracing cursor T is displayed at a predetermined point (here, at the apex) on the selected graph graphic and the coordinates of the tracing cursor T "X=0, Y=30" are displayed (step S56) as shown in FIG. 9B.

Figure 9C:
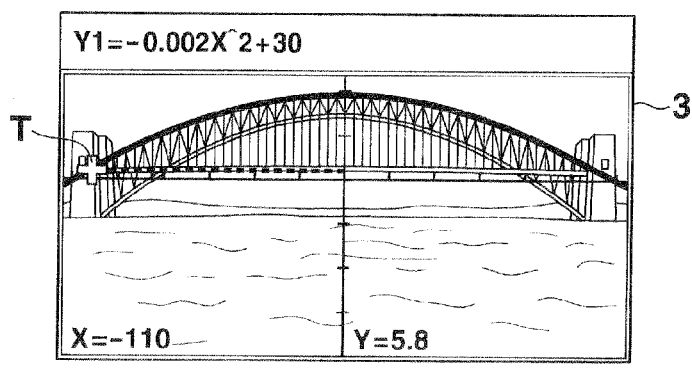
FIG. 9C is a diagram showing a display content of the display.
Figure 9D:
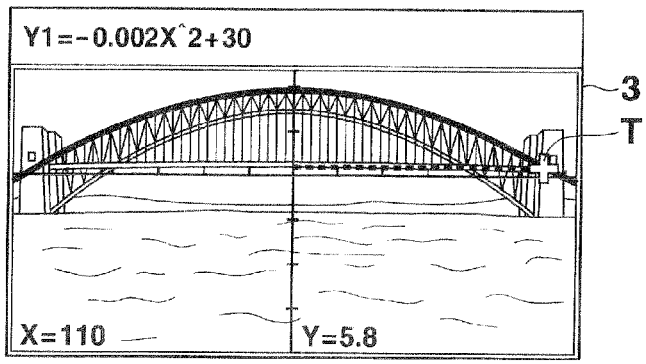
FIG. 9D is a diagram showing a display content of the display.

Next, when a user performs a cursor operation to move the tracing cursor T on the selected graph graphic, the coordinates of the tracing cursor T after the moving are displayed (step S57) as shown in FIGS. 9C and 9D.

Operation Example (2)

Figure 10A:
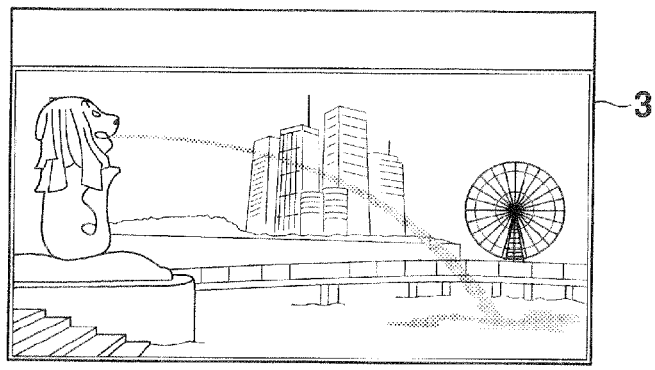
FIG. 10A is a diagram showing a display content of the display.

First, a user performs an operation for reading out an image file 100 from the storage unit 13 (step S1; Yes) and designates an image file 100, the designated image file 100 is read out from the storage unit 13 and displayed in the display 3 as the background image (step S2) as shown in FIG. 10A. Here, in the operation example, a photographed image of the Merlion which spews water in parabolic manner and Ferris wheel is displayed as the background image.

Figure 10B:
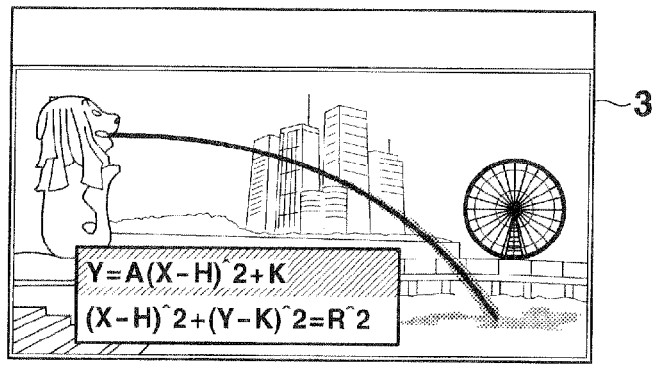
FIG. 10B is a diagram showing a display content of the display.

Next, when a user performs an operation for searching graph graphics (step S11; Yes), graph graphics which are circle, oval and parabola shapes are detected in the background image (step S12). Further, graphs are rendered respectively overlapping the detected graph graphics and the graph equations are displayed respectively in the same color as the display colors of the corresponding graphs (step S21) as shown in FIG. 10B. Here, in FIG. 10B, the graph overlapping the parabolic water spewed from the Merlion and the upper graph equation "$Y=A(X-H)^2+K$" are displayed in blue, and the graph overlapping the circular portion of the Ferris wheel and the lower graph equation "$(X-H)^2+(Y-K)^2=R^2$" are displayed in red.

Figure 10C:
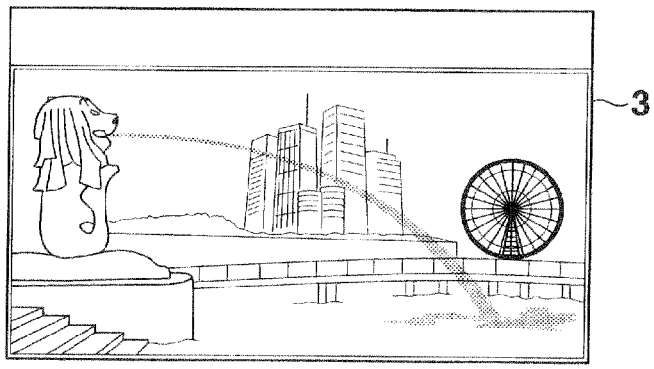
FIG. 10C is a diagram showing a display content of the display.

Thereafter, when a user selects the graph graphic in circular shape as the selected graph graphic, the graph and graph equation of the parabola shape are deleted from the display 3 (step S22) as shown in FIG. 10C.

Next, the selected graph graphic is determined as being circle or oval (step T2; Yes) and the lowest part of the graph graphic is set as the position of the point of origin (step T3).

Figure 10D:
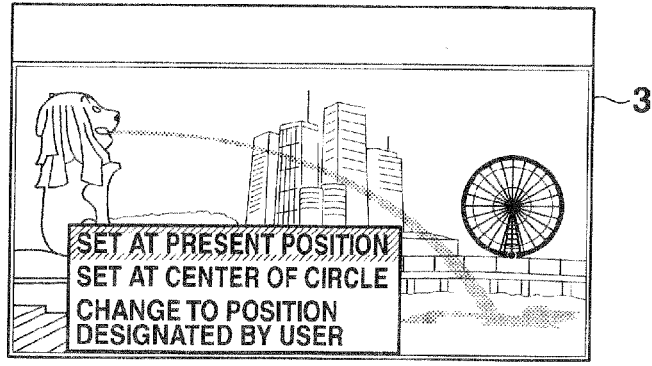
FIG. 10D is a diagram showing a display content of the display.

Next, when a user performs an operation for correcting the position of the point of origin (step S24; Yes), the point of origin is to be displayed at the position of the point of origin set as of this moment (the lowest part of the graph graphic) (step S25) as shown in FIG. 10D.

Next, the selected graph graphic is determined as being circle or oval (step S26; Yes) and setting menu of the position of the point of origin, which are "set at present position", "set at center of circle" and "change to position designated by user", are displayed (step S27). Then, when a user selects "set at present position", the position of the point of origin is maintained without being changed (step S28).

Figure 11A:
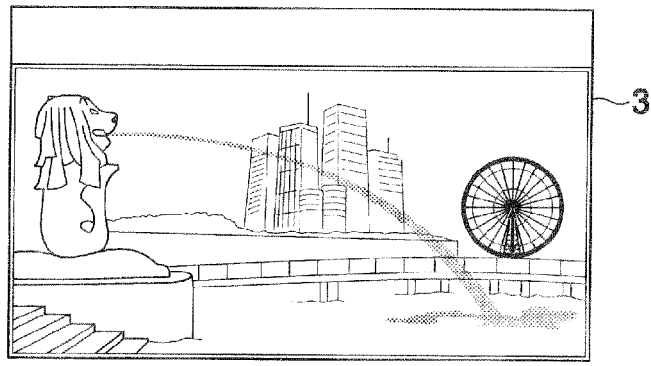
FIG. 11A is a diagram showing a display content of the display.

Next, after a user performs an operation for setting the length of a line segment in the background image (step S31; Yes) and an operation for correcting the line segment subject to the setting (step S33; Yes), the line segment subject to length setting is reset so that the line segment which is from the position of the point of origin to the center of the graph graphic (circle) in the background image, that is the line segment corresponding to the radius of the Ferris wheel, be the line segment subject to length setting (step S35) as shown in FIG. 11A.

Figure 11B:
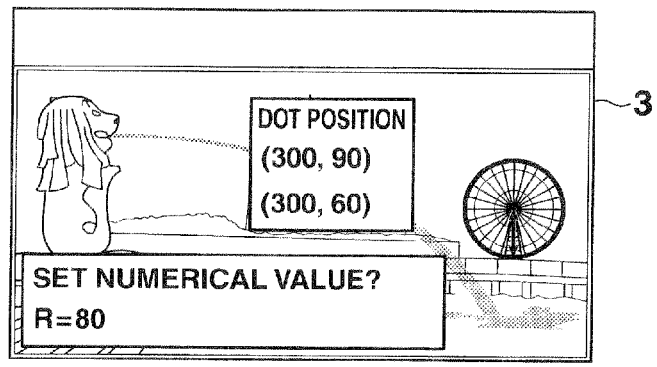
FIG. 11B is a diagram showing a display content of the display.

Next, when a user inputs the length "80" of the line segment subject to length setting based on the actual radius of the Ferris wheel in the image (step S36) as shown in FIG. 11B, the length per one dot (Ld=2.667 . . . ) is calculated by dividing the input numeral value "80" by the number of dots in the line segment (here, "30") (step S37) and the display range of XY coordinate system (Xmin=−800, Xmax=208, Ymin=−160, Ymax=336) is calculated (step S38).

Figure 11C:
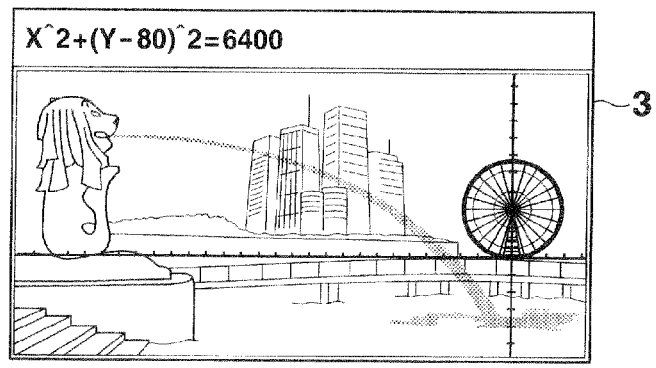
FIG. 11C is a diagram showing a display content of the display.

After the calculated display range is set in the display region of the display 3 (step S41), the graph equation of the selected graph graphic is calculated by the least-square method based on the display range, and the calculation result "$X^2+(Y-80)^2=6400$" is displayed in the display 3 as shown in FIG. 11C (step S42).

Figure 11D:
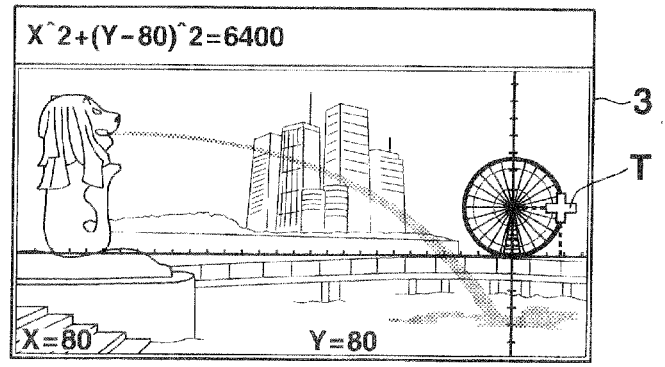
FIG. 11D is a diagram showing a display content of the display.

Next, when a user performs an operation to executed tracing of the selected graph graphic (step S55; Yes), a tracing cursor T is to be displayed at a predetermined point on the selected graph graphic and the coordinates "X=80, Y=80" of the tracing cursor T are displayed (step S56) as shown in FIG. 11D.

Further, when a user selects a graph graphic of parabola shape as the selected graph graphic in a state shown in FIG. 10B, the circular graph and the graph equation thereof are deleted from the display 3 (step S22) as shown in FIG. 12A.

Next, the selected graph graphic is determines as being a parabola opened upward or downward among various parabolas (step T5; Yes), not being approximately bilaterally symmetric (step T6; No) and being only one side of the parabola from its apex (step T11; Yes), and the position at the lower left corner of the rectangle surrounding the selected graph graphic is set as the position of the point of origin (step T12). Here, the position of the point of origin set as described above is shown by a black dot in FIG. 12A for the sake of convenience (see lower left in the drawing).

Then, after a user performs an operation for setting the length of a line segment in the background image (step S31; Yes) and an operation for correcting the line segment subject to the setting (step S33; Yes), the line segment subject to length setting is reset so that the line segment which is from the position of the point of origin to the upper end of the graph graphic in the background image, that is the line segment corresponding to the height of the parabola part be the line segment subject to length setting (step S35) as shown in FIG. 12B.

Next, when a user inputs the length "8" of the line segment subject to length setting based on the actual height of the parabola in the image (step S36) as shown in FIG. 12C, the length per one dot (Ld=0.0889) is calculated by dividing the input numeral value "8" by the number of dots in the line segment (here, "90") (step S37) and the display range of XY coordinate system (Xmin=−7.8, Xmax=25.6, Ymin=−2.2, Ymax=14.3) is calculated (step S38).

After the calculated display range is set in the display region of the display 3 (step S41), the graph equation of the selected graph graphic is calculated by the least-square method based on the display range, and the calculation result "$Y=-0.03X^2+11$" is displayed in the display 3 (step S42) as shown in FIG. 12D.

Next, when a user performs an operation to executed tracing of the selected graph graphic (step S55; Yes), a tracing cursor T is to be displayed at a predetermined point on the selected graph graphic and the coordinates "X=0, Y=11" of the tracing cursor T are displayed (step S56) as shown in FIG. 12E.

Then, when a user moves the tracing cursor T on the selected graph graphic by performing a cursor operation, the coordinates of the tracing cursor T after the moving are displayed as shown in FIG. 12F (step S57).

As described above, according to the scientific electronic calculator 1 of the embodiment, graph graphics matching any of the predetermined graph shapes are detected in an image and graphs are rendered respectively overlapping the graph graphics, and the point of origin of the coordinates is set in the image according to the position and shape of the graphs, and further, when any one of line segments among a plurality of line segments included in the image is designated as the line segment subject to length input and the length is input based on user's operation, the display range of the coordinate system to be set superimposing on the image is calculated based on the input length and the graph equation is calculated and displayed based on the display range as shown in steps S8 and S12, steps S21 to S23 and steps 32 to S42 of FIG. 3, FIGS. 7A to 7F, FIGS. 8A to 8C, FIGS. 10A to 10D and FIGS. 12A to 12F, for example. Therefore, the graph shape represented by an object or an event in the image and the graph equation expressing the graph shape in line with its actual size can be studied in relation to each other.

Further, as shown in steps S52 to S54 of FIG. 4, FIGS. 8D to 8F and FIG. 9A, for example, when any one of line segments among the line segments included in the image is designated as the line segment subject to length calculation based on user's operation, the length of the line segment subject to length calculation is calculated and displayed based on the length of the line segment subject to length input. Therefore, this can help understanding of the graph equation and learning can be enhanced.

Moreover, as shown in steps S21 to S22 in FIG. 3 and FIGS. 7D and 10B, for example, when a plurality of graph graphics matching a predetermined graph shape are detected in the image and when any of the graph graphics is selected among the plurality of detected graph graphics based on user's operation, a graph is rendered overlapping the selected graph graphic. Therefore, even when a plurality of graph graphics are included in the image, a graph of the desired graph graphic can be rendered and the graph shape and graph equation of the desired graph graphic can be studied in relation to each other. Further, as shown in FIGS. 10A to 10D, FIGS. 11A to 11D and FIGS. 12A to 12F, when two types of objects, one being close and the other being far, exist in the photographed image, each object can be studied by the graph shape thereof and the graph equation expressing the graph shape in line with the actual size being related to each other.

Furthermore, as shown in steps S6 to S8 in FIG. 3 and FIGS. 7B to 7D, for example, when a graph shape type is selected based on user's operation, a graph shape matching the selected graph shape is detected in the image. Therefore, the desired graph shape and the graph equation thereof can be studied in relation to each other.

Here, detailed configurations and detailed operations of constituents of the scientific electronic calculator 1 according to the above embodiment can be changed within the scope of the present invention.

For example, a scientific electronic calculator and such like are described as an electronic device according to the present invention. However, products in which the present invention can be applied to are not limited to scientific electronic calculators and such like, and the present invention can be applied widely across general electronic devices such as cell phones, personal computers, PDA (Personal Digital Assistant), game machines and so forth. Further, the program 130 of the present invention can be stored in a memory card, CD or the like which is detachable to the scientific electronic calculator 1.

Moreover, the vertical axis of the coordinate system is Y axis and the horizontal axis of the coordinate system is X axis in the above description. However, other names can be used for coordinate axis. Further, the coordinate system is described as being an orthogonal coordinate system. However, the coordinate system can be other types of coordinate system such as oblique coordinate system, polar coordinate system or the like.

What is claimed is:
1. An electronic device, comprising:
a display which displays an image;
a graph graphic detection unit which detects graph graphics matching predetermined graph shapes in the image;
a graph rendering unit which renders graphs overlapping the graph graphics which are detected by the graph graphic detection unit;
a length input line segment designation unit which designates any one of line segments included in the image as a line segment subject to length input based on a user's operation;
a line segment length input unit which inputs a given length of the line segment designated by the length input line segment designation unit, based on a user's operation;
a point of origin setting unit which sets a point of origin of an XY coordinate system in the image according to positions and shapes of the graphs;
a display range calculation unit which calculates a display range of the XY coordinate system which is set so as to be superimposed on the image based on the input length of the designated line segment, the XY coordinate system having a minimum X coordinate value, a maximum X coordinate value, a minimum Y coordinate value, and a maximum Y coordinate value;
a graph equation calculation unit which calculates graph equations of the rendered graphs based on the display range and displays calculation results on the display; and
a trace coordinate display unit which displays a tracing point on one of the rendered graphs, moves the tracing point on the graph according to a user's operation, and displays coordinates of the moved tracing point.

2. The electronic device as claimed in claim 1, wherein:
the graph graphic detection unit detects graph graphics of a parabola or a circle included in the image, and
the point of origin setting unit comprises:
    a circle determination unit which determines whether a detected graph graphic is a parabola or a circle; and
    a lowest part setting unit which, when the circle determination unit determines that the detected graph graphic is a circle, sets a position of a lowest part of the detected graph graphic as the point of origin.

3. The electronic device as claimed in claim 1, wherein:
the graph graphic detection unit detects graph graphics of a parabola or a circle included in the image, and
the point of origin setting unit comprises:
    a parabola determination unit which determines whether a detected graph graphic is a parabola opened upward or downward;
    a symmetric determination unit which, when the parabola determination unit determines that the graph graphic is a parabola opened upward or downward, determines whether the graph graphic is bilaterally symmetric;
    an upward open determination unit which, when the symmetric determination unit determines that the graph graphic is bilaterally symmetric, determines whether the graph graphic is a parabola opened upward;
    a first apex setting unit which, when the upward open determination unit determines that the graph graphic is a parabola opened upward, sets a position of an apex of the graph graphic as the point of origin; and
    a second apex setting unit which, when the upward open determination unit determines that the graph graphic is not a parabola opened upward, sets the point of origin at a position where an X coordinate of the apex of the graph graphic is set as an X coordinate of the point of origin and a Y coordinate of a lowest part of the graph graphic is set as a Y coordinate of the point of origin.

4. The electronic device as claimed in claim 1, wherein:
the graph graphic detection unit detects graph graphics of a parabola or a circle, included in the image, and
the point of origin setting unit comprises:
a parabola determination unit which determines whether a detected graph graphic is a parabola opened upward or downward;
a symmetric determination unit which, when the parabola determination unit determines that the graph graphic is a parabola opened upward or downward, determines whether the graph graphic is bilaterally symmetric;
a one side determination unit which, when the symmetric determination unit determines that the graph graphic is not bilaterally symmetric, determines whether the graph graphic is only one side of a parabola from an apex; and
a lower left corner setting unit which, when the one side determination unit determines that the graph graphic is one side of a parabola from the apex, sets a position of a lower left corner of a rectangle including the graph graphic as the point of origin.

5. The electronic device as claimed in claim 1, further comprising:
a length calculation line segment designation unit which designates any one of the line segments included in the image as a line segment subject to length calculation based on a user's operation; and
a line segment length calculation unit which calculates and displays a length of the line segment designated by the length calculation line segment designation unit based on the input length of the line segment designated by the length input line segment designation unit.

6. An electronic device, comprising:
a display which displays an image;
a graph graphic detection unit which detects graph graphics of a parabola and a circle included in the image;
a graph graphic selection unit which selects any graph graphic from the graph graphics of a parabola and a circle detected by the graph graphic detection unit, based on a user's operation;
a graph rendering unit which renders a graph overlapping the graph graphic selected by the graph graphic selection unit;
a line segment length input unit which inputs a given length of any line segment among line segments included in the image, based on a user's operation;
a display range calculation unit which calculates a display range of an XY coordinate system which is to be set so as to be superimposed on the image based on the input length of the line segment, the XY coordinate system having a minimum X coordinate value, a maximum X coordinate value, a minimum Y coordinate value, and a maximum Y coordinate value; and
a graph equation calculation unit which calculates a graph equation of the rendered graph based on the display range, and which displays a calculation result on the display.

7. The electric device as claimed in claim 6,
wherein the graph rendering unit comprises:
a color graph rendering unit which renders graphs in different colors by overlapping the graphs of different colors on the graph graphics of a parabola and a circle which are detected by the graph graphic detection unit;
a color graph equation display unit which displays general equations of graphs corresponding to the detected graph graphics respectively, in colors which are the same as colors of the rendered graphs; and
wherein the graph graphic selection unit comprises a graph equation selection unit which selects a general equation of any of the graphs displayed by the color graph equation display unit.

8. A graph display method, comprising:
detecting graph graphics matching predetermined graph shapes in an image displayed on a display;
rendering graphs overlapping the detected graph graphics;
designating any one of line segments included in the image as a line segment subject to length input based on a user's operation;
inputting a given length of the designated line segment based on a user's operation;
setting a point of origin of an XY coordinate system in the image according to positions and shapes of the graphs;
calculating a display range of the XY coordinate system which is to be set so as to be superimposed on the image based on the input length of the designated line segment, the XY coordinate system having a minimum X coordinate value, a maximum X coordinate value, a minimum Y coordinate value, and a maximum Y coordinate value;
calculating, based on the display range, graph equations of the rendered graphs, and displaying calculation results on the display; and
displaying a tracing point on one of the rendered graphs, moving the tracing point on the rendered graph according to a user's operation, and displaying coordinates of the moved tracing point on the display.

9. A graph display method, comprising:
detecting graph graphics of a parabola and a circle included in an image displayed on a display;
selecting any graph graphic from the detected graph graphics of a parabola and a circle, based on a user's operation;
rendering a graph overlapping the selected graph graphic;
inputting a given length of any line segment among line segments included in the image, based on a user's operation;
first calculating a display range of an XY coordinate system which is set so as to be superimposed on the image based on the input length of the line segment, the XY coordinate system having a minimum X coordinate value, a maximum X coordinate value, a minimum Y coordinate value, and a maximum Y coordinate value; and
second calculating a graph equation of the rendered graph based on the display range, and displaying a calculation result on the display.

10. A non-transitory computer readable recording medium having stored thereon a program that is executable by a computer which comprises a display, the program being executable by the computer to cause the computer to function as:
a graph graphic detection unit which detects graph graphics matching predetermined graph shapes in an image displayed on the display;
a graph rendering unit which renders graphs overlapping the graph graphics which are detected by the graph graphic detection unit;

a length input line segment designation unit which designates any one of line segments included in the image as a line segment subject to length input based on a user's operation;

a line segment length input unit which inputs a given length of the line segment designated by the length input line segment designation unit, based on a user's operation;

a point of origin setting unit which sets a point of origin of an XY coordinate system in the image according to positions and shapes of the graphs;

a display range calculation unit which calculates a display range of the XY coordinate system which is set so as to be superimposed on the image based on the input length of the designated line segment, the XY coordinate system having a minimum X coordinate value, a maximum X coordinate value, a minimum Y coordinate value, and a maximum Y coordinate value;

a graph equation calculation unit which calculates graph equations of the rendered graphs based on the display range and displays calculation results on the display; and a trace coordinate display unit which displays a tracing point on one of the rendered graphs, moves the tracing point on the graph according to a user's operation, and displays coordinates of the moved tracing point.

11. A non-transitory computer readable recording medium having stored thereon a program that is executable by a computer which comprises a display, the program being executable by the computer to cause the computer to function as:

a graph graphic detection unit which detects graph graphics of a parabola and a circle included in an image displayed on the display;

a graph graphic selection unit which selects any graph graphic from the graph graphics of a parabola and a circle detected by the graph graphic detection unit, based on a user's operation;

a graph rendering unit which renders a graph overlapping the graph graphic selected by the graph graphic selection unit;

a line segment length input unit which inputs a given length of any line segment among line segments included in the image, based on a user's operation;

a display range calculation unit which calculates a display range of an XY coordinate system which is to be set so as to be superimposed on the image based on the input length of the line segment, the XY coordinate system having a minimum X coordinate value, a maximum X coordinate value, a minimum Y coordinate value, and a maximum Y coordinate value; and a graph equation calculation unit which calculates a graph equation of the rendered graph based on the display range, and which displays a calculation result on the display.

* * * * *